US007969480B2

(12) United States Patent
Kim et al.

(10) Patent No.: US 7,969,480 B2
(45) Date of Patent: Jun. 28, 2011

(54) METHOD OF CONTROLLING AUTO WHITE BALANCE

(75) Inventors: Gyu Won Kim, Gyunggi-do (KR); Won Tae Choi, Gyunggi-do (KR)

(73) Assignee: Samsung Electro-Mechanics, Co., Ltd., Gyunggi-do (KR)

( * ) Notice: Subject to any disclaimer, the term of this patent is extended or adjusted under 35 U.S.C. 154(b) by 436 days.

(21) Appl. No.: 12/273,962

(22) Filed: Nov. 19, 2008

(65) Prior Publication Data

US 2010/0020192 A1    Jan. 28, 2010

(30) Foreign Application Priority Data

Jul. 25, 2008  (KR) .................... 10-2008-0073126

(51) Int. Cl.
*H04N 9/73* (2006.01)
*G06K 9/00* (2006.01)
(52) U.S. Cl. ............... 348/223.1; 382/162; 382/167
(58) Field of Classification Search ........... 348/223.1; 382/162–167
See application file for complete search history.

(56) References Cited

U.S. PATENT DOCUMENTS

| | | | |
|---|---|---|---|
| 5,808,697 A * | 9/1998 | Fujimura et al. | 348/672 |
| 6,798,449 B2 | 9/2004 | Hsieh | |
| 6,965,401 B1 * | 11/2005 | Takei | 348/225.1 |
| 2002/0122120 A1 * | 9/2002 | Hsieh | 348/231 |
| 2008/0068468 A1 * | 3/2008 | Kitajima | 348/223.1 |
| 2008/0266417 A1 * | 10/2008 | Abe | 348/223.1 |

FOREIGN PATENT DOCUMENTS

KR    10-2004-0067086 A    7/2004

\* cited by examiner

*Primary Examiner* — Sinh Tran
*Assistant Examiner* — Christopher K Peterson
(74) *Attorney, Agent, or Firm* — Lowe, Hauptman, Ham & Berner, LLP

(57) ABSTRACT

There is provided a method of controlling auto white balance that can be appropriately used for a camera of an electric device that uses a wide-angle or a super wide-angle lens. A method of controlling auto white balance according to an aspect of the invention may include: converting a color space of an input image from an RGB color space into a YCbCr color space; dividing the input image into a plurality of divided regions; selecting a predetermined number of divided regions in order determined by mean values of Y of pixels included in the plurality of divided regions; comparing a predetermined threshold value with the number of pixels having values of Cb and Cr within a predetermined Cb-Cr range among the pixels included in the selected divided regions in order to determine a white area; and calculating auto white balance gains by using mean values of Y, mean values of Cb, and mean values of Cr of the pixels included in each of the selected divided regions when the number of pixels within the predetermined Cb-Cr range is greater than the threshold value.

7 Claims, 3 Drawing Sheets

METHOD OF CONTROLLING AUTO WHITE BALANCE

CROSS-REFERENCE TO RELATED APPLICATIONS

This application claims the priority of Korean Patent Application No. 2008-0073126 filed on Jul. 25, 2008, in the Korean Intellectual Property Office, the disclosure of which is incorporated herein by reference.

BACKGROUND OF THE INVENTION

1. Field of the Invention

The present invention relates to digital image processing, and more particularly, to a method of controlling auto white balance that can accurately display white when a camera of an electric device uses a wide-angle lens that may cause deterioration in image quality and a variation in color distribution due to unnecessary light incident from the surrounding environment.

2. Description of the Related Art

In general, human eyes always perceive the same subject as having the same color under different light sources. That is, even when one light source is switched to another light source, such as sunlight, a fluorescent lamp, and an incandescent lamp, which has a different color temperature, human eyes always see white as white. On the other hand, since an image sensor using a solid-state image capturing device converts light into an electrical signal, the image sensor directly detects colors of the subject that vary according to the light sources. Therefore, most of the digital image processing apparatuses, for example, digital cameras, use algorithms for controlling auto white balance so that the colors detected by the image sensor can be similar to colors perceived by human eyes.

Auto white balance performed in the digital image processing apparatus is generally controlled by representing a subject appearing white with intermediate luminance in an image as color signals (RGB signals) having the same output level. In the related art, the most commonly used algorithm to control auto white balance calculates a mean color value on the assumption that a mean color value of the screen is white regardless of a variation in light source, obtains gains of color signal levels so that the mean color value can be white, and applies the obtained gains to the entire image. For example, in the related art, the method of controlling auto white balance integrates values of Cb and Cr of color signals of pixels in an area supposed to be white in the input image, calculates mean values, and controls gains of red (R) and blue (B). In the related art, the method of controlling auto white balance determines areas supposed to be white for the entire input image by using the same method. Therefore, a digital imaging apparatus, for example, a camera of an electric device, which uses a wide-angle lens in which a relatively considerable amount of light is incident to the edge of the image, has difficulty in exactly displaying colors of the edge of the image, that is, difficulty with precise auto white balance.

SUMMARY OF THE INVENTION

An aspect of the present invention provides a method of controlling auto white balance that can simplify a hardware configuration performing auto white balance, and be used for a camera of an electric device using a wide-angle lens causing color distortion in the edge of an image.

According to an aspect of the present invention, there is provided a method of controlling auto white balance, the method including: converting a color space of an input image from an RGB color space into a YCbCr color space; dividing the input image into a plurality of divided regions; selecting a predetermined number of divided regions in order determined by mean values of Y of pixels included in the plurality of divided regions; comparing a predetermined threshold value with the number of pixels having values of Cb and Cr within a predetermined Cb-Cr range among the pixels included in the selected divided regions in order to determine a white area; and calculating auto white balance gains by using mean values of Y, mean values of Cb, and mean values of Cr of the pixels included in each of the selected divided regions when the number of pixels within the predetermined Cb-Cr range is greater than the threshold value.

The method may further include: selecting additional divided regions greater than the predetermined number in order determined in the selecting of the divided regions when the number of pixels within the predetermined Cb-Cr range is smaller than the threshold value, wherein the comparing the predetermined threshold value with the number of pixels may include comparing the predetermined threshold value with the number of pixels having values of Cb and Cr within the predetermined Cb-Cr range among the additionally selected divided regions and the divided regions selected in the selecting of the divided regions.

The selecting the divided regions may include: outputting a mean value of Y of the pixels included in each of the plurality of divided regions; applying weight to the output mean value of Y according to whether each of the divided regions is located; and selecting the predetermined number of divided regions according to the magnitude of the mean values of Y applied with the weight. In the applying of the weight, the less weight may be applied to a divided region located at the edge of the input image.

The predetermined Cb-Cr range used in the comparing of the predetermined threshold value with the number of pixels may be varied according to each of the selected divided regions on the basis of the mean value of Y of the pixels included in each of the selected divided regions. The predetermined Cb-Cr range may become narrower when a divided region has a higher mean value of Y.

The outputting the auto white balance gains may include: converting the mean values of Y, the mean values of Cb, and the mean values of Cr of the pixels included in the selected divided regions into mean values of R, mean values of G, and mean values of B; and determining auto white balance gains of values of R and B of the input image as "mean values of G/mean values of R" and "mean values of G/mean values of B".

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
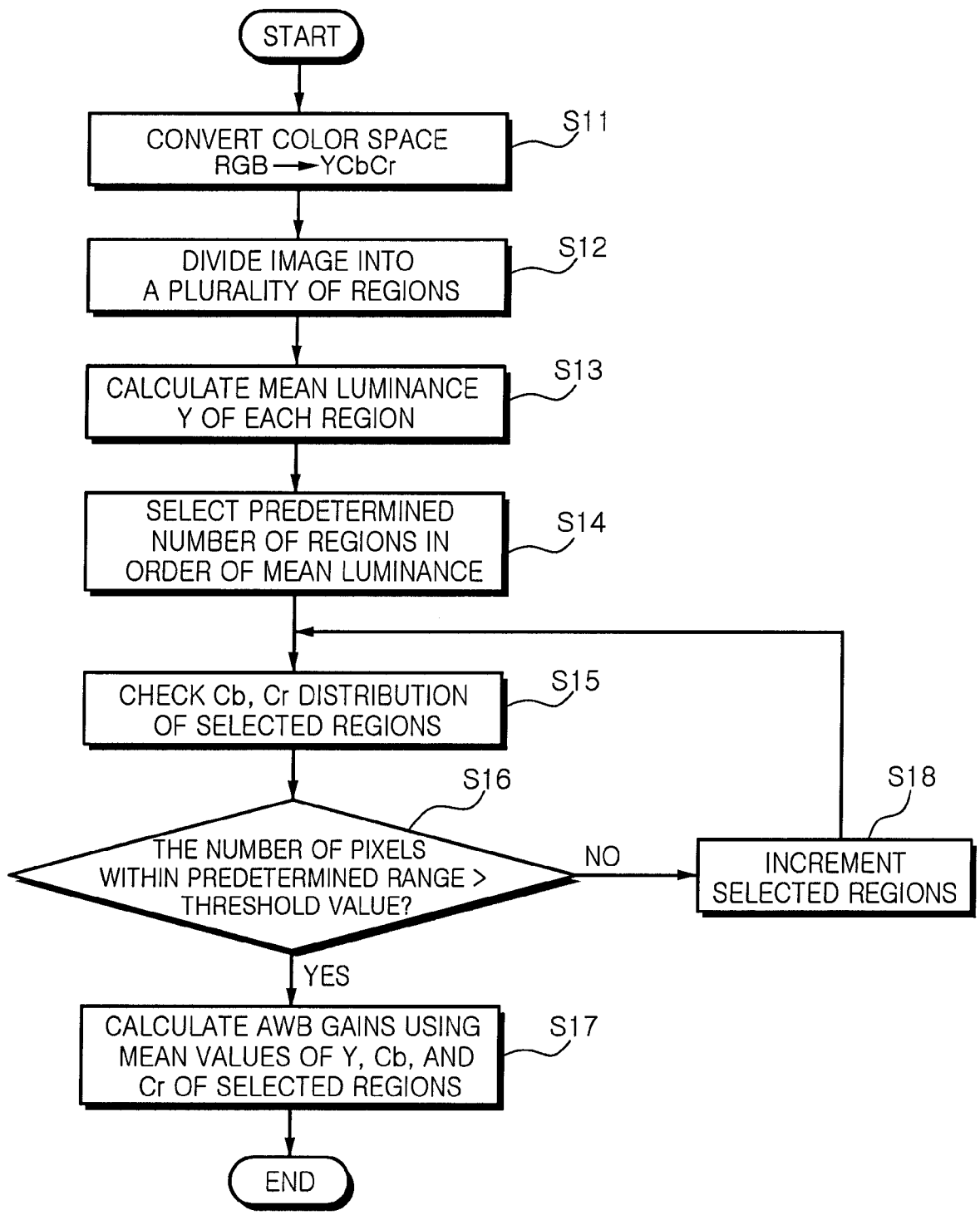
FIG. 1 is a flowchart illustrating a method of controlling auto white balance according to an exemplary embodiment of the invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a flowchart illustrating a method of controlling auto white balance according to an exemplary embodiment of the invention.

Referring to FIG. 1, in order to control auto white balance according to this embodiment, a color space of an input image is converted from an RGB color space into a YCbCr color space in operation S11. Then, the input image is divided into a plurality of divided regions in operation S12. A mean value of Y of pixels included in each of the divided regions is obtained according to each of the divided regions in operation S13. A predetermined number of divided regions are selected in order determined by the mean values of Y of the pixels included in the respective divided regions in operation S14. Cb-Cr distribution of each of the pixels included in each of the selected divided regions is checked in operation S15. The number of pixels having values of Cb and Cr within a predetermined Cb-Cr range is compared with a predetermined threshold value in operation S16. When the number of pixels having the values of Cb and Cr within the predetermined Cb-C range is greater than the threshold value, auto white balance gains are calculated by using mean values of Y, Cb, and Cr of the pixels included in the selected divided regions in operation S17.

In operation S18, when the number of pixels within the predetermined Cb-Cr range is smaller than the threshold value, additional divided regions greater than the predetermined number may be selected in order determined in operation S14, in addition to the divided regions selected in operation S14. In this embodiment, the operations S15 and S16 are repeated so that Cb-Cr distribution is checked with respect to the added selected divided regions, and among the pixels included in the divided regions selected in operation S14 and the added selected divided regions, the number of pixels having values of Cb and Cr within the predetermined Cb-Cr range is compared with the predetermined threshold value.

Figure 2:
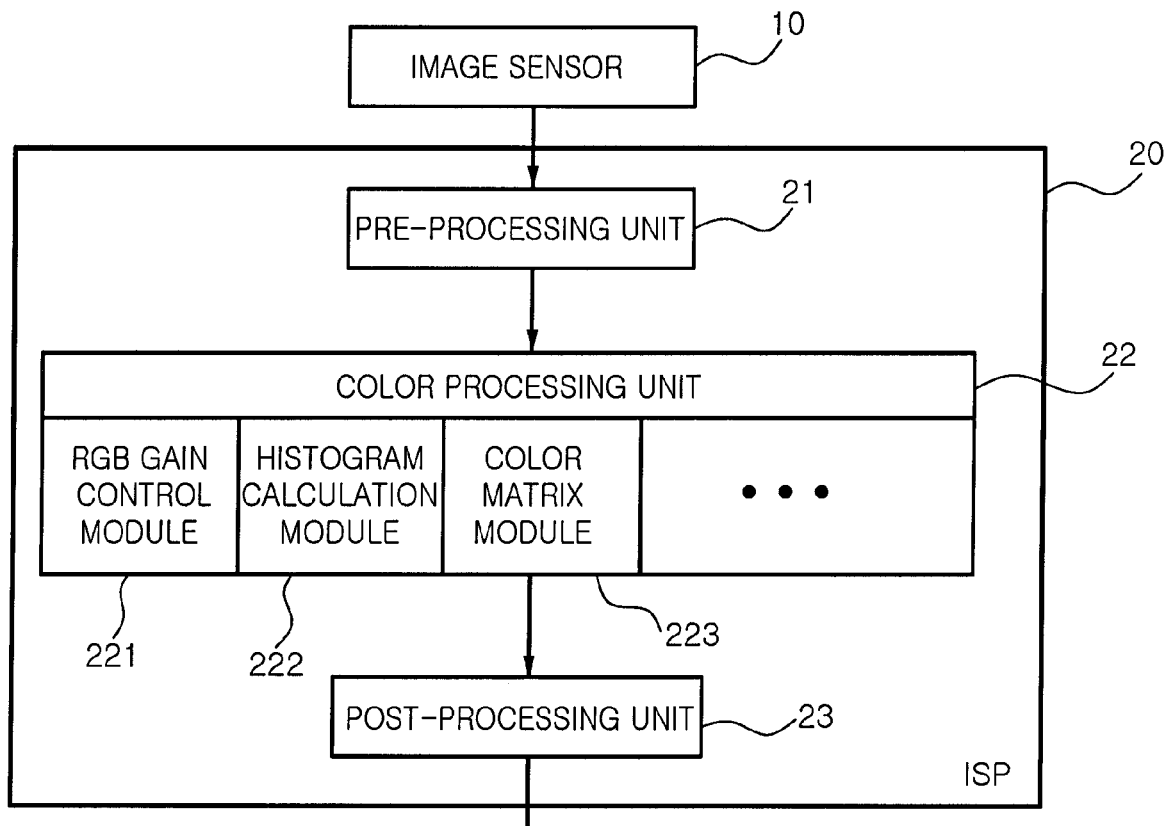
FIG. 2 is a block diagram illustrating an example of hardware using the method of controlling auto white balance according to an exemplary embodiment of an invention.

FIG. 2 is a block diagram illustrating an example of hardware using a method of controlling auto white balance according to an exemplary embodiment of the invention.

Referring to FIG. 2, the hardware using the method of controlling auto white balance according to this embodiment may include an image sensor 10 and an image signal processor (ISP) 20. The image signal processor 20 may include a pre-processing unit 21, a color processing unit 22, and a post-processing unit 23. The method of controlling auto white balance according to this embodiment may be performed in an RGB gain control module 221 and a histogram calculation module 222 of the color processing unit 22.

Figure 3:
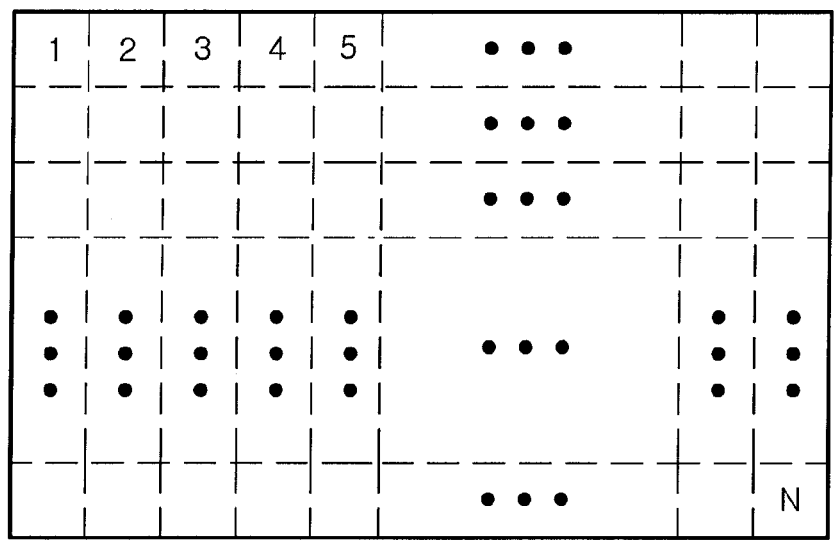
FIG. 3 is a view illustrating divided regions of an image obtained by performing an operation of dividing the input image into a plurality of divided regions in a method of controlling auto white balance according to an exemplary embodiment of the invention.

FIG. 3 is a view illustrating divided regions of an input image obtained by performing an operation of dividing the input image into a plurality of divided regions in a method of controlling auto white balance according to an exemplary embodiment of the invention.

According to the embodiment of the invention, in operation S12 of dividing the input image into the plurality of divided regions, the input image may be divided into n number of divided regions having the same area as shown in FIG. 3. In another embodiment of the invention, the plurality of divided regions may have different areas or different shapes according to whether they are located in the entire image.

Figure 4:
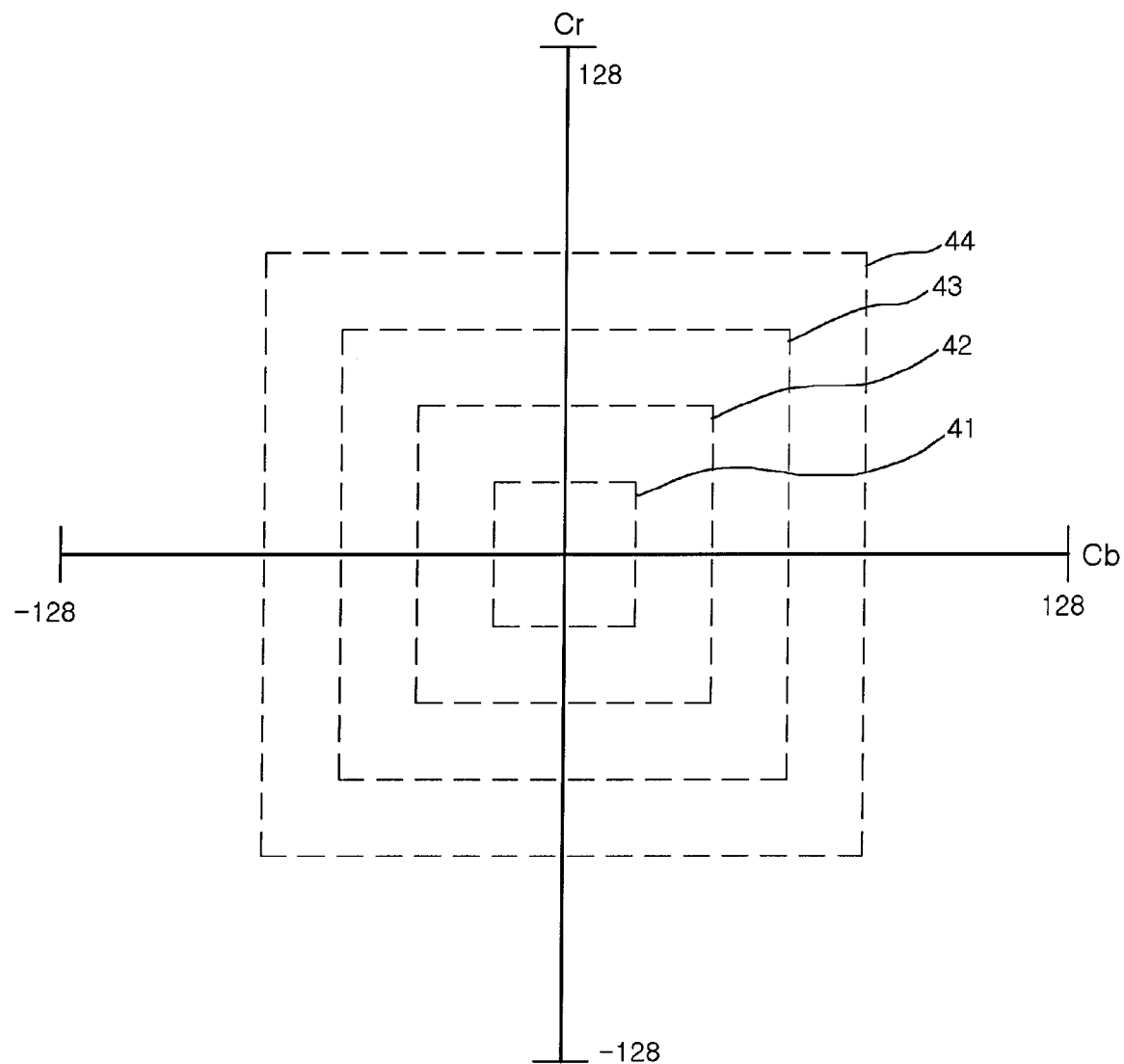
FIG. 4 is a view illustrating examples of a Cb-Cr range used to check the distribution of values of Cb and Cr of each of the divided regions according to a mean value of Y of each of the divided regions.

FIG. 4 is a view illustrating examples of Cb-Cr ranges (41 to 44) used to check distribution of values of Cb and Cr according to each of the divided regions by using a mean value of Y of each of the divided regions. As described above, among the pixels included in the divided regions selected in operation S16, the number of pixels having values of Cb and Cr within the predetermined Cb-Cr range is compared with the predetermined threshold value. The predetermined Cb-Cr range may vary according to the mean value of Y of the pixels included in each of the divided regions. Preferably, when one divided region has a higher mean value of Y, the Cb-Cr range may become narrower. For convenience of explanation, the Cb-Cr range is represented by a square in Cb-Cr plane. However, the invention is not limited thereto. The Cb-Cr range may be represented by different shapes.

Hereinafter, the operation and effect of the invention will be described in more detail with reference to the accompanying drawings.

Referring to FIGS. 1 and 2, the image sensor 10 captures a desired scene to generate an image signal, and the image signal is transmitted to a pre-processing unit of the ISP 20. The image signal output from the image sensor 10 may be a Bayer pattern image signal that includes pixels each having one color of RGB. A pre-processing unit 21 of the ISP 20 receives the image signal of Bayer pattern, performs color interpolation, and generates a color image including pixels each having an RGB value in an RGB color space. The color image represented in an RGB color space is transmitted to the color processing unit 22. The histogram calculation module 222 of the color processing unit performs various kinds of operations to obtain RGB gains to be applied to the input color image, that is, auto white balance gains.

The histogram calculation module 222 converts the color space of the input color image from an RGB color space into a YCbCr color space represented by a luminance signal and color difference signals in operation S12.

Then, the histogram calculation module 222 divides the input color image into a plurality of divided regions (for example, divided regions in FIG. 3).

The histogram calculation module 222 accumulatively adds luminance values (Y values) of pixels included in each of the plurality of divided regions, and calculates an average thereof in operation S13. During this process, the histogram calculation module 222 may calculate a cumulative sum and a mean value of color difference values (Cb value and Cr value) of the pixels included in each of the plurality of divided regions. The mean values of Y, Cb, and Cr may be calculated according to each of the divided regions.

Then, in operation S14, the histogram calculation module 222 selects divided regions used to output color gains for auto white balance by using the mean values of Y that are calculated in operation S13. Specifically, the histogram calculation module 222 may select a predetermined number of divided regions according to the magnitude of the mean values of Y in operation S14.

Preferably, the histogram calculation module 222 may apply weight to the mean values of Y according to where the divided regions are located in the entire image, and select a predetermined number of divided regions according to the magnitude of the mean values of Y given the weight instead of selecting the divided regions according to the magnitude of the simple mean values of Y in operation S14. A digital imaging apparatus using a wide-angle lens or a super wide-angle lens, such as a camera of an electric device, captures a very large area. Therefore, unnecessary light is incident from the surrounding environment, and thus distortion may occur in color distribution of the edge of the image. In order to perform auto white balance by eliminating the undesirable influence caused by unnecessary light on the edge of the image, the histogram calculation module 222 gives less weight to the divided regions located around the edge of the image. As a result, the effect that the divided regions located around the edge has in determining the auto white balance gains can be reduced.

The histogram calculation module 222 checks Cb-Cr distribution of each of the pixels of each of the selected divided regions in operation S15, and compares the number of pixels having values of Cb and Cr within the predetermined Cb-Cr range with the predetermined threshold value in operation S16. In operation S16 of the comparison, the histogram calculation module 222 may use different Cb-Cr ranges 41 to 44 varying according to the individual divided regions as shown in FIG. 4. The Cb-Cr range may be determined according to the mean value of Y of each of the divided regions. Generally, an image with higher luminance is more likely to be estimated as white. That is, the higher the luminance is, the more number of pixels are located close to the origin of the Cb-Cr distribution, shown in FIG. 4. Therefore, when the Cb-Cr range is extended in the image with high luminance, it is more likely to select a pixel having color, not white. Therefore, preferably, a relative narrow Cb-Cr range is used for a region with high luminance, and a relatively wide Cb-Cr range is used for a divided region with a low mean value of Y.

Then, when the number of pixels having values of Cb and Cr within the predetermined Cb-Cr range according to each of the selected divided regions is greater than the predetermined threshold value, a main processor (not shown) of the digital imaging apparatus receives the mean values of Y, the mean values of Cb, and the mean values of Cr of the selected divided regions from the histogram calculation module 222, and performs an operation on color gains for auto white balance. For example, the main processor converts the mean values of Y, the mean values of Cb, and the mean values of Cr of the selected divided regions into mean values of R, mean values of G, and mean values of B, and determines auto white balance gains with respect to the R and B values of the input image as [average G values/average R values] and [average G values/average B values].

The auto white balance gains obtained by the above-described process are transmitted to the RGB gain control unit of the color processing unit 22 from the main processor, and applied to the input color image. The color image to which the auto white balance gains are applied is subjected to color correction by the color matrix module 223, and then transmitted to the post-processing unit 23.

When the number of pixels having values of Cb and Cr within the predetermined Cb-Cr range in the selected divided regions is smaller than the predetermined threshold value, it is determined that the number of pixels used to calculate color gains for auto white balance is not sufficient, and thus divided regions are additionally selected in operation S18. The selection of the additional divided regions may be performed in order determined in consideration of the weight in the aforementioned operation S14. That is, at least one divided region that is not selected in operation S14 may be additionally selected.

As such, after the divided region is additionally selected, the operation S15 of checking the Cb-Cr distribution with respect to both of the previously divided regions and the additionally selected regions and the operation S16 of comparing the number of pixels having values of Cb and Cr within the predetermined Cb-Cr range with the threshold value may be repeated. The operation S18 of additionally selecting a divided region may be repeated until the number of pixels having the values of Cb and Cr within the predetermined Cb-Cr range becomes greater than the threshold value in operation S16. A maximum value of the number of divided regions selected to be used for auto white balance may be previously determined. Even when the divided regions are selected as many as the number of the maximum value, auto white balance may not be performed unless the number of pixels having the values of Cb and Cr within the predetermined Cb-Cr range becomes greater than the threshold value.

As described above, according to the exemplary embodiment of the invention, the input image is divided into a plurality of regions, a white area is selected according to a value of Y by using Y, Cb, and Cr data, and white balance is performed by analyzing Cb-Cr distribution, such that the design of hardware for auto white balance can be simplified. Further, weight is given to each of the divided regions, and regions used to calculate white balance gains are selected, such that auto white balance can be exactly performed even in a camera of an electric device that uses a wide-angle lens causing color distortion in the edge.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of controlling auto white balance, the method comprising;
   converting a color space of an input image from an RGB color space into a YCbCr color space;
   dividing the input image into a plurality of divided regions;
   selecting a predetermined number of divided regions in order determined by mean values of Y of pixels included in the plurality of divided regions;
   comparing a predetermined threshold value with the number of pixels having values of Cb and Cr within a predetermined Cb-Cr range among the pixels included in the selected divided regions in order to determine a white area; and
   calculating auto white balance gains by using mean values of Y, mean values of Cb, and mean values of Cr of the pixels included in each of the selected divided regions when the number of pixels within the predetermined Cb-Cr range is greater than the threshold value.

2. The method of claim 1, further comprising: selecting additional divided regions greater than the predetermined number in order determined in the selecting the divided regions when the number of pixels within the predetermined Cb-Cr range is smaller than the threshold value,
   wherein the comparing the predetermined threshold value with the number of pixels comprises comparing the predetermined threshold value with the number of pixels having values of Cb and Cr within the predetermined Cb-Cr range among the additionally selected divided regions and the divided regions selected in the selecting of the divided regions.

3. The method of claim 1, wherein the selecting the divided regions comprises:
   outputting a mean value of Y of the pixels included in each of the plurality of divided regions;
   applying weight to the output mean value of Y according to whether each of the divided regions is located; and
   selecting the predetermined number of divided regions according to the magnitude of the mean values of Y applied with the weight.

4. The method of claim 3, wherein in the applying the weight, the less weight is applied to a divided region located at the edge of the input image.

5. The method of claim 1, wherein the predetermined Cb-Cr range used in the comparing the predetermined threshold value with the number of pixels is varied according to each of the selected divided regions on the basis of the mean value of Y of the pixels included in each of the selected divided regions.

6. The method of claim 5, wherein the predetermined Cb-Cr range becomes narrower when a divided region has a higher mean value of Y.

7. The method of claim 1, wherein the outputting the auto white balance gains comprises:
   converting the mean values of Y, the mean values of Cb, and the mean values of Cr of the pixels included in the selected divided regions into mean values of R, mean values of G, and mean values of B; and
   determining auto white balance gains of values of R and B of the input image as "mean values of G/mean values of R" and "mean values of G/mean values of B".

* * * * *